US012180905B1

(12) United States Patent
Surapaneni et al.

(10) Patent No.: US 12,180,905 B1
(45) Date of Patent: Dec. 31, 2024

(54) AIR INDUCTION SYSTEM

(71) Applicant: FCA US LLC, Auburn Hills, MI (US)

(72) Inventors: Sreekanth Surapaneni, Oakland, MI (US); Suresh Vemuri, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/499,331

(22) Filed: Nov. 1, 2023

(51) Int. Cl.
*F02D 41/00* (2006.01)
*F02M 35/10* (2006.01)

(52) U.S. Cl.
CPC ... *F02D 41/0002* (2013.01); *F02M 35/10255* (2013.01); *F02M 35/10262* (2013.01); *F02D 2200/50* (2013.01); *F02D 2200/60* (2013.01)

(58) Field of Classification Search
None
See application file for complete search history.

(56) References Cited

U.S. PATENT DOCUMENTS 5,072,698 A * 12/1991 Fujihira ............. F02B 29/0456 123/184.55
5,347,974 A * 9/1994 Togai ................. F02D 41/1487 123/682
6,758,193 B1 * 7/2004 Kincaid ............... F02M 35/161 123/542
9,528,427 B2 * 12/2016 Nakasugi ......... F02M 35/10268
2020/0318579 A1 * 10/2020 Honda ................. F02M 25/089

FOREIGN PATENT DOCUMENTS

DE 102009014967 A1 * 9/2010 ............. B60K 13/02
DE 102011084797 A1 * 4/2013 ................ B60T 5/00
DE 102009014967 B4 * 11/2017 ............. B60K 13/02

* cited by examiner

*Primary Examiner* — Kevin R Steckbauer
(74) *Attorney, Agent, or Firm* — Jeremy J. Klobucar

(57) ABSTRACT

A vehicle including an air intake system including an air snorkel that is configured to provide air to the engine, a brake duct configured for receipt of ambient air located exterior to the vehicle and to direct the ambient air to a brake assembly to cool the brake assembly, an auxiliary duct having a first end coupled to the brake duct and a second end coupled to the air snorkel, and a valve located between the auxiliary duct and the brake duct. The valve is configured to permit the ambient air to cool the brake assembly when the valve is in an open position, and the valve is configured to permit the ambient air to enter the auxiliary duct and travel to the air intake system when the valve is in the closed position.

12 Claims, 2 Drawing Sheets

AIR INDUCTION SYSTEM

FIELD

Figure 1:
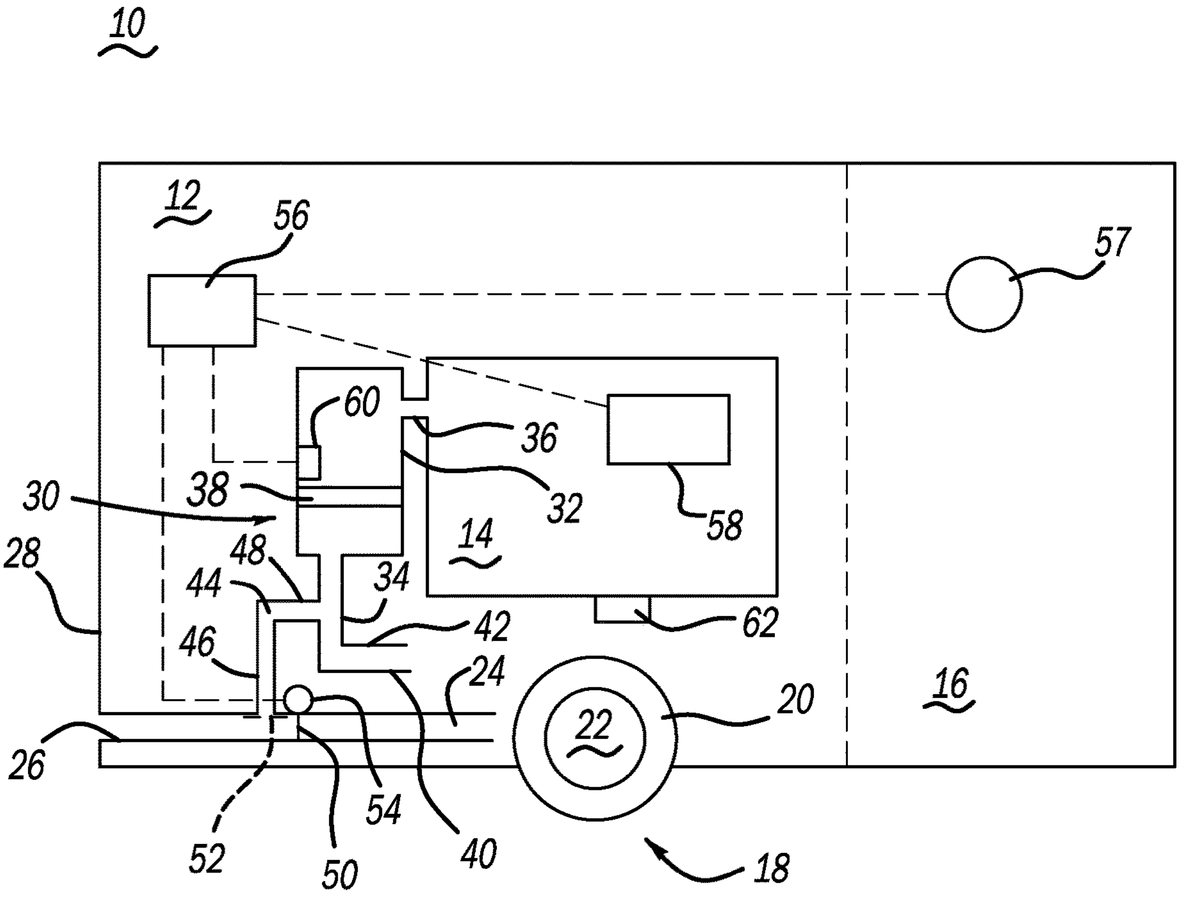

The present disclosure relates to an air induction system for an engine.

BACKGROUND

This section provides background information related to the present disclosure which is not necessarily prior art.

Internal combustion engines require a continuous flow of air in order to enable combustion, and air induction systems are the primary means by which this air is delivered to the engine. Air Charge Temperature, or ACT, is the temperature of the air entering the intake manifold. A higher ACT can create inefficient combustion, engine knocking, and engine degradation over time. A lower ACT, in contrast, can increase engine performance, longevity, and fuel economy. Accordingly, it is desirable to provide air to the engine that has a lower ACT.

Conventionally, in order to significantly lower ACT, an inlet for the induction system may be located close to the ground. Locating the inlet close to the ground, however, creates a risk of water, snow, or other types of debris entering the inlet of the air induction system, which is undesirable. In addition, locating the inlet close to the ground can also create noise, vibration, and harshness (NVH) conditions that are undesirable.

SUMMARY

This section provides a general summary of the disclosure and is not a comprehensive disclosure of its full scope or all of its features.

According to a first aspect of the present disclosure there is provided a vehicle including an engine; an air intake system including an air snorkel that is configured to provide air to the engine; a brake duct configured for receipt of ambient air located exterior to the vehicle and to direct the ambient air to a brake assembly to cool the brake assembly; an auxiliary duct that connects the brake duct and the air snorkel, the auxiliary duct having a first end coupled to the brake duct and a second end coupled to the air snorkel; and a valve located between the auxiliary duct and the brake duct, the valve being positioned proximate (i.e., near) the first end of the auxiliary duct and configured to permit or prevent the ambient air from entering the auxiliary duct, wherein the valve is configured to permit the ambient air to cool the brake assembly when the valve is in an open position; and wherein the valve is configured to permit the ambient air to enter the auxiliary duct and travel to the air intake system when the valve is in the closed position.

According to the first aspect, the vehicle may also include a controller; and a motor configured to actuate the valve between the open and closed positions and in communication with the controller, the motor being configured to open and close the valve based on an instruction received from the controller.

According to the first aspect, the controller is configured to instruct the motor to open and close the valve based on a user input.

According to the first aspect, the vehicle may also include a control knob in communication with the controller and configured to receive the user input.

According to the first aspect, the controller is configured to instruct the motor to open and close the valve based on a signal received from either a sensor or an electronic control unit (ECU) of the engine.

According to the first aspect, the sensor is a temperature sensor located in an engine bay of the vehicle that includes the engine, the temperature sensor being configured to generate a signal indicative of an air temperature in the engine bay, and if the temperature sensor generates a signal indicative of the air temperature in the engine bay being above a predetermined threshold, the controller is configured to close the valve to permit ambient air to enter the auxiliary duct of the air induction system.

According to the first aspect, the air induction system includes a housing between the auxiliary duct and the engine, the sensor is located in the housing and is configured to generate signals indicative of a temperature of the air located in the housing, and if the sensor generates a signal indicative of the temperature in the housing being above a predetermined threshold, the controller is configured to close the valve to permit ambient air to enter the auxiliary duct of the air induction system.

According to the first aspect, the air induction system includes a housing between the auxiliary duct and the engine, the sensor is located in the housing and is configured to generate signals indicative of a volume of the air passing through the housing to the engine, and if the sensor generates a signal indicative of the volume of air passing through the housing that indicates that the engine is operating under the increased load, the controller is configured to close the valve to permit ambient air to enter the auxiliary duct of the air induction system.

According to the first aspect, the ECU is configured to communicate signals to the controller that are indicative of the engine operating under an increased load, wherein upon receipt of the signals from the ECU that are indicative of the increased load, the controller is configured to close the valve to permit ambient air to enter the auxiliary duct of the air induction system.

According to a second aspect of the present disclosure, there is provided a vehicle that may include an engine bay and a passenger cabin; an engine having an electronic control unit (ECU) provided in the engine bay; an air intake system located in the engine bay and including a housing, an air snorkel attached to the housing that is configured to provide air to the engine via the housing from the engine bay, and a sensor positioned in the housing; a brake duct configured for receipt of ambient air located exterior to the vehicle and to direct the ambient air to a brake assembly to cool the brake assembly; an auxiliary duct that connects the brake duct and the air snorkel, the auxiliary duct having a first end coupled to the brake duct and a second end coupled to the air snorkel; and a valve located between the auxiliary duct and the brake duct, the valve being positioned proximate (i.e., near) the first end of the auxiliary duct and configured to permit or prevent the ambient air from entering the auxiliary duct, wherein the valve is configured to permit the ambient air to cool the brake assembly when the valve is in an open position; and wherein the valve is configured to permit the ambient air to enter the auxiliary duct and travel to the air intake system when the valve is in the closed position.

According to the second aspect, the vehicle may also include a controller; and a motor configured to actuate the valve between the open and closed positions and in communication with the controller, the motor being configured to open and close the valve based on an instruction received from the controller.

According to the second aspect, the controller is configured to instruct the motor to open and close the valve based on a user input.

According to the second aspect, the vehicle may also include a control knob located in the passenger cabin that is in communication with the controller and configured to receive the user input.

According to the second aspect, the controller is configured to instruct the motor to open and close the valve based on a signal received from either the sensor or the ECU.

According to the second aspect, the sensor is configured to generate signals indicative of a temperature of the air located in the housing, and if the sensor generates a signal indicative of the temperature in the housing being above a predetermined threshold, the controller is configured to close the valve to permit ambient air to enter the auxiliary duct of the air induction system.

According to the second aspect, the sensor is configured to generate signals indicative of a volume of the air passing through the housing to the engine, and if the sensor generates a signal indicative of the volume of air passing through the housing that indicates that the engine is operating under the increased load, the controller is configured to close the valve to permit ambient air to enter the auxiliary duct of the air induction system.

According to the second aspect, the ECU is configured to communicate signals to the controller that are indicative of the engine operating under an increased load, wherein upon receipt of the signals from the ECU that are indicative of the increased load, the controller is configured to close the valve to permit ambient air to enter the auxiliary duct of the air induction system.

According to the second aspect, the vehicle may also include a temperature sensor located in an engine bay in communication with the controller and configured to generate a signal indicative of an air temperature in the engine bay, and if the temperature sensor generates a signal indicative of the air temperature in the engine bay being above a predetermined threshold, the controller is configured to close the valve to permit ambient air to enter the auxiliary duct of the air induction system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
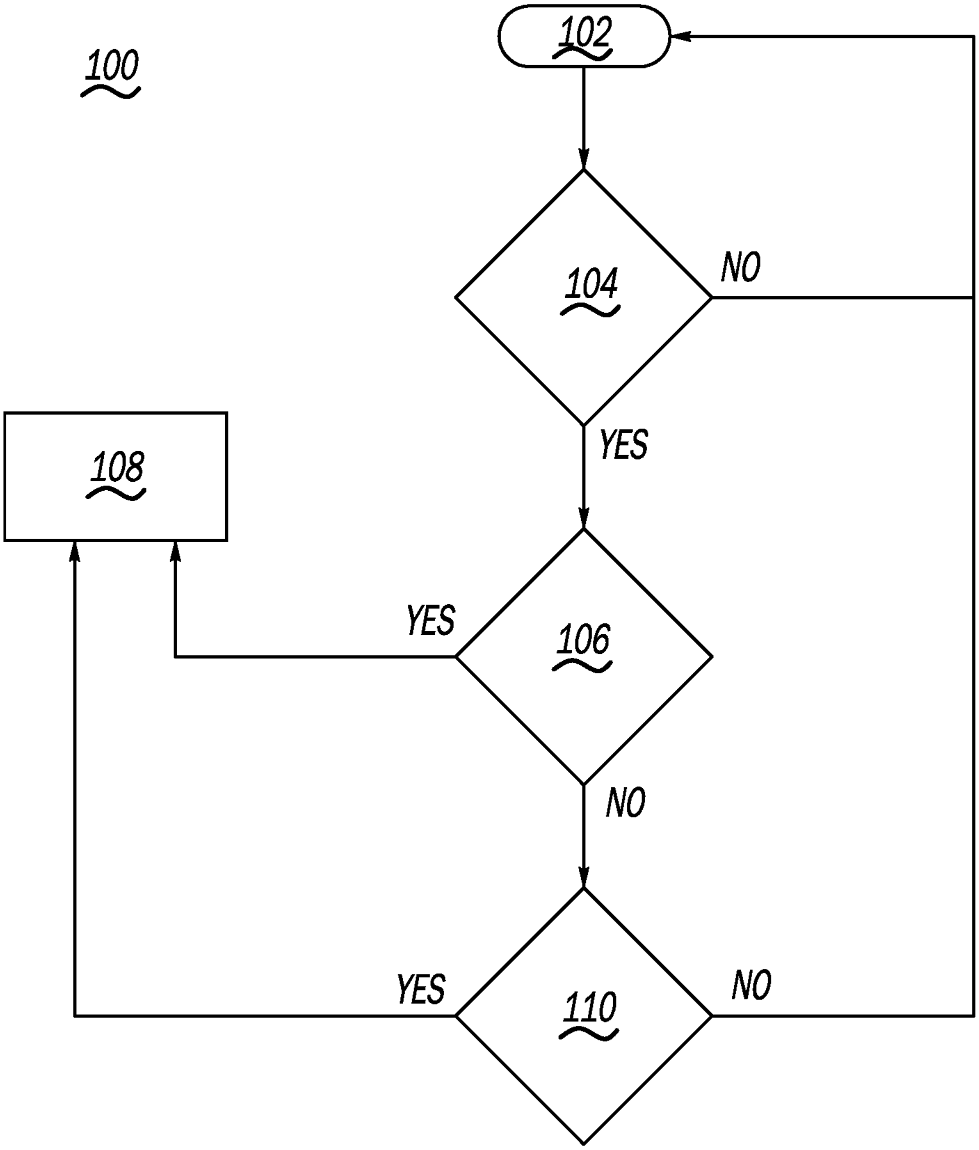

FIG. 1 is a schematic illustration of a vehicle having an air induction system according to a principle of the present disclosure; and FIG. 2 is a flowchart for operation of the air induction system illustrated in FIG. 1.

Corresponding reference numerals indicate corresponding parts throughout the several views of the drawings.

DETAILED DESCRIPTION

Example embodiments will now be described more fully with reference to the accompanying drawings.

FIG. 1 schematically illustrates a vehicle 10 according to the present disclosure. Vehicle 10 includes an engine bay 12 having an engine 14 and a passenger cabin 16. Engine 14 may provide power to a pair of front wheel assemblies 18 (of which only one is illustrated in FIG. 1), which each include a wheel 20, a brake assembly 22, and other known components (e.g., tire). The brake assemblies 22 may be cooled by air that is directed to the brake assembly 22 by a brake duct 24, which is configured for receipt of cool ambient air through an inlet 26 located at the front 28 of the vehicle 10. Brake duct 24 directs the cool ambient air to the brake assemblies 22 in order to cool the brake assemblies 22 during operation of vehicle 10.

As noted above, engine bay 12 houses engine 14, which includes an air induction system 30 configured to provide air to engine 14 for combustion. Air induction system 30 includes a housing 32 attached to engine 14. Housing includes an inlet 34 and an outlet 36, and is configured to support an air filter 38. Inlet 34 is connected to a snorkel 40 having an open terminal end 42 configured for drawing intake air to inlet 34 of housing 32. Air may be drawn through snorkel 40 using an impeller (not shown). In the illustrated embodiment, open terminal end 42 is positioned in engine bay 12 such that snorkel 40 draws the intake air from engine bay 12. Inasmuch as open terminal end 42 is drawing air from engine bay 12, the air charge temperature (ACT) of the intake air may be elevated because of heat generated by engine 14 during operation thereof. If the ACT of the intake air is too great (e.g., at temperatures above 100 degrees C.), performance of engine 14 may be negatively affected. Thus, according to the present disclosure, vehicle 10 is provided with an auxiliary duct 44 that is located between and connects the brake duct 24 and the snorkel 40.

Auxiliary duct 44 includes a first end 46 coupled to the brake duct 24 and a second end 48 coupled to the snorkel 40 at a location downstream from open terminal end 42. Because auxiliary duct 44 is connected to brake duct 24, auxiliary duct 44 is in communication with a source of air (i.e., the ambient environment located exterior to vehicle 10) that has a lower ACT in comparison to the ACT of the air located in engine bay 12 Thus, auxiliary duct 44 is configured to provide cool air to snorkel 40 in order to lower the ACT of the air being supplied to the engine 14.

It should be understood that auxiliary duct 44 is not always feeding air from brake duct 24 to snorkel 40. In contrast, flow of air into auxiliary duct 44 is controlled by a valve 50 that is moveable between a closed position (illustrated) that prevents the ambient air entering inlet 26 of brake duct 24 from reaching brake assembly 22 and permits the ambient air to enter the auxiliary duct 44 and enter air induction system 30, and an open position 52 (shown in phantom) that closes the first end 46 of auxiliary duct 44 and permits the ambient air entering inlet 26 of brake duct 24 to reach and cool the brake assembly 22. While valve 50 is illustrated as being located in brake duct 24, it should be understood that valve 50 may be located in inlet 46 of auxiliary duct 44 without departing from the scope of the present disclosure.

Valve 50 may be a sheet of material formed of, for example, metal or a polymeric material that is sized and shaped to correspond to the cross-sectional shape of the duct (e.g., brake duct 24 or auxiliary duct 44) where valve is positioned. Valve 50 may be moved between the open 52 and closed (illustrated) positions using a motor 54 that is operable based on instructions received from a controller 56, as will be described in more detail below. While valve 50 has been described above as movable between open 52 and closed (illustrated) positions, it should be understood that brake duct valve 50 can also be moved by motor 54 to a plurality of intermediate positions as well, where the intermediate positions enable the ambient air to reach each of snorkel 40 and brake assembly 22 simultaneously.

Controller 56 is configured to control valve 50 based on a plurality of different conditions. In one embodiment, the vehicle 10 may be provided with a drive mode selection knob or button 57 located in the passenger cabin 14 that may be actuated by an occupant located in cabin 14. The occupant (e.g., driver) of vehicle 10 may decide to actuate the button 57 when the occupant desires engine 14 to draw air to engine 14 having a lower ACT. Example instances where the occupant may desire drawing air to engine 14 having a lower ACT include when the occupant desires maximum output by engine 14 such as when accelerating, travelling up an incline, or using the vehicle 10 to tow. In this example, valve 50 may only be opened and closed based on actuation of button 57.

It should be understood, however, that valve 50 can be opened and closed without input from an occupant of the vehicle 10. Put another way, valve 50 may opened and closed automatically by controller 56 based on various operating conditions of the vehicle 10. In this regard, as best shown in FIG. 1, it can be seen that controller 56 is in communication with an electronic control unit (ECU) 58 of engine 14 as well as a sensor 60 located within housing 32 of air induction module 30. If engine 14 is operating under increased loads (i.e., accelerating, towing, travelling up an incline, etc.), ECU 58 can send a signal indicative of the increased load to controller 56. Based on the signal(s) indicative of increased load received by controller 56 from ECU 58, controller 56 can decide whether to move valve 50 to a position that permits the ambient air in brake duct 24 to enter auxiliary duct 44 and provide air having a lower ACT to engine 14.

Sensor 60 located in housing 32 may be a temperature sensor configured to generate signals indicative of a temperature of the air located in housing 32 or a mass flow sensor configured to generate signals indicative of a mass (e.g., volume) of air passing through housing 32. If sensor 60 is a temperature sensor and the signals indicative of temperature indicate that the ACT of the air within housing 32 is above a predetermined value (e.g., 100 degrees C.), controller 56 can determine whether to actuate motor 54 and move valve 50 to a position that permits the ambient air in brake duct 24 to enter first end 46 of auxiliary duct 44 and enter air induction system 30. Similarly, if sensor 60 is a mass flow sensor and sensor 60 generates a signal indicative of an increased volume of air passing through housing 32 to engine 14, controller 56 can determine that engine 14 is operating under an increased load and may require air having a lower ACT to optimize performance of engine 14. Thus, controller 56 would close valve 50 to prevent air from reaching the brake assembly 22 and enable the air having the lower ACT to enter auxiliary duct 44 of air induction system 30.

In yet another example, the vehicle 10 may be equipped with a temperature sensor 62, which may be located inside the engine bay 12 and exterior to housing 32, and configured to generate signals indicative of temperature of the air located in engine bay 12. As noted above, terminal open end 42 of snorkel 40 is located in engine bay 12 and is configured to draw air to engine 14 from engine bay 12. If the ACT of the air in engine bay 12 is too high (e.g., above 100 degrees C.), temperature sensor 62 can send a signal indicative of the temperature to controller 56 to decide whether to operate valve 50 to permit air to enter auxiliary duct 44 and enter air induction system 30. Based on this signal, controller 56 can control motor 54 to close valve 50.

Turning now to FIG. 2, a flowchart of a method 100 by which the air induction system 30 may operate is illustrated. The method may include a start block 102 which may include turning on the ignition of the vehicle 10. The method 100 may then include a step 104 where it is determined whether the engine 14 of the vehicle 10 is running. If it is determined that engine 14 is not running, the method 100 may proceed back to start block 102. If it is determined that the engine 14 is running, the method may proceed to step 106 where it is determined whether an event has occurred that would require actuation of valve 50 to prevent from air from reaching brake assembly 22 and permit the air to enter the auxiliary duct 44 of air induction system 30.

At step 106, it is first determined whether button 57 has been actuated to request that the valve 50 be closed to prevent air from reaching the brake assembly 22 and permit the air to enter the auxiliary duct 44. If yes, controller 56 will actuate motor 54 to close valve 50 and permit the air to enter the auxiliary duct 44 (block 108). If no, the method 100 can proceed to block 110 to determine whether any conditions exist where controller 56 should instruct motor to open valve 50.

For example, it can be determined at block 110 whether the vehicle 10 is towing or hauling a heavy load based on signals indicative of engine load received from ECU 58 or sensor 60 (when sensor 60 is a mass flow sensor), whether sensors 60 (when sensor 60 is a temperature sensor) and/or 62 are generating signals indicative of the ACT being above the predetermined threshold, and whether vehicle 10 is accelerating which can be determined by ECU 56 or sensor 60 when sensor 60 is a mass flow sensor. If yes to any of these conditions, controller 56 can actuate motor 54 to close valve 50 and permit the air from brake duct 24 to enter auxiliary duct 44. If no, the can return to block 102 where the process may be repeated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:

an engine;

an air intake system including an air snorkel that is configured to provide air to the engine;

a brake duct configured for receipt of ambient air located exterior to the vehicle and to direct the ambient air to a brake assembly to cool the brake assembly;

an auxiliary duct that connects the brake duct and the air snorkel, the auxiliary duct having a first end coupled to the brake duct and a second end coupled to the air snorkel;

a valve positioned proximate the first end of the auxiliary duct and configured to permit or prevent the ambient air from entering the auxiliary duct;

a motor configured to actuate the valve between an open and a closed position and in communication with a controller, the motor being configured to open and close the valve based on an instruction received from the controller, and the controller being configured to instruct the motor to open and close the valve based on a user input; and a control knob in communication with the controller and configured to receive the user input, wherein the valve is configured to permit the ambient air to cool the brake assembly when the valve is in the open position that permits the ambient air to reach the brake assembly and prevents the ambient air from travelling from the brake duct into the first end of the auxiliary duct; and wherein the valve is configured to permit the ambient air to enter the auxiliary duct and travel to the air intake system when the valve is in the closed position that permits the ambient air to enter the first end of the auxiliary duct from the brake duct, and prevents the ambient air from reaching the brake assembly.

2. The vehicle according to claim 1, wherein the controller is further configured to instruct the motor to open and close the valve based on a signal received from either a sensor or an electronic control unit (ECU) of the engine.

3. The vehicle according to claim 2, wherein the sensor is a temperature sensor located in an engine bay of the vehicle that includes the engine, the temperature sensor being configured to generate a signal indicative of an air temperature in the engine bay, and if the temperature sensor generates a signal indicative of the air temperature in the engine bay being above a predetermined threshold, the controller is configured to close the valve to permit ambient air to enter the auxiliary duct of the air induction system.

4. The vehicle according to claim 2, wherein the air induction system includes a housing between the auxiliary duct and the engine, the sensor is located in the housing and is configured to generate signals indicative of a temperature of the air located in the housing, and if the sensor generates a signal indicative of the temperature in the housing being above a predetermined threshold, the controller is configured to close the valve to permit ambient air to enter the auxiliary duct of the air induction system.

5. The vehicle according to claim 2, wherein the air induction system includes a housing between the auxiliary duct and the engine, the sensor is located in the housing and is configured to generate signals indicative of a volume of the air passing through the housing to the engine, and if the sensor generates a signal indicative of the volume of air passing through the housing that indicates that the engine is operating under an increased load, the controller is configured to close the valve to permit ambient air to enter the auxiliary duct of the air induction system.

6. The vehicle according to claim 2, wherein the ECU is configured to communicate signals to the controller that are indicative of the engine operating under an increased load, wherein upon receipt of the signals from the ECU that are indicative of the increased load, the controller is configured to close the valve to permit ambient air to enter the auxiliary duct of the air induction system.

7. A vehicle, comprising:

an engine bay and a passenger cabin;

an engine having an electronic control unit (ECU) provided in the engine bay;

an air intake system located in the engine bay and including a housing, an air snorkel attached to the housing that is configured to provide air to the engine via the housing from the engine bay, and a sensor positioned in the housing;

a brake duct configured for receipt of ambient air located exterior to the vehicle and to direct the ambient air to a brake assembly to cool the brake assembly;

an auxiliary duct that connects the brake duct and the air snorkel, the auxiliary duct having a first end coupled to the brake duct and a second end coupled to the air snorkel;

a valve positioned proximate the first end of the auxiliary duct and configured to permit or prevent the ambient air from entering the auxiliary duct;

a motor configured to actuate the valve between an open and a closed position and in communication with a controller, the motor being configured to open and close the valve based on an instruction received from the controller, and the controller being configured to instruct the motor to open and close the valve based on a user input; and a control knob located in the passenger cabin that is in communication with the controller and configured to receive the user input, wherein the valve is configured to permit the ambient air to cool the brake assembly when the valve is in an open position that permits the ambient air to reach the brake assembly and prevents the ambient air from travelling from the brake duct into the first end of the auxiliary duct; and wherein the valve is configured to permit the ambient air to enter the auxiliary duct and travel to the air intake system when the valve is in the closed position that permits the ambient air to enter the first end of the auxiliary duct from the brake duct, and prevents the ambient air from reaching the brake assembly.

8. The vehicle according to claim 7, wherein the controller is further configured to instruct the motor to open and close the valve based on a signal received from either the sensor or the ECU.

9. The vehicle according to claim 8, wherein the sensor is configured to generate signals indicative of a temperature of the air located in the housing, and if the sensor generates a signal indicative of the temperature in the housing being above a predetermined threshold, the controller is configured to close the valve to permit ambient air to enter the auxiliary duct of the air induction system.

10. The vehicle according to claim 8, wherein the sensor is configured to generate signals indicative of a volume of the air passing through the housing to the engine, and if the sensor generates a signal indicative of the volume of air passing through the housing that indicates that the engine is operating under an increased load, the controller is configured to close the valve to permit ambient air to enter the auxiliary duct of the air induction system.

11. The vehicle according to claim 8, wherein the ECU is configured to communicate signals to the controller that are indicative of the engine operating under an increased load, wherein upon receipt of the signals from the ECU that are indicative of the increased load, the controller is configured to close the valve to permit ambient air to enter the auxiliary duct of the air induction system.

12. The vehicle according to claim 7, further comprising a temperature sensor located in an engine bay in communication with the controller and configured to generate a signal indicative of an air temperature in the engine bay, and if the temperature sensor generates a signal indicative of the air temperature in the engine bay being above a predetermined threshold, the controller is configured to close the valve to permit ambient air to enter the auxiliary duct of the air induction system.

* * * * *